United States Patent [19]

Arterbury

[11] Patent Number: 4,885,818
[45] Date of Patent: Dec. 12, 1989

[54] ERGONOMIC KNIFE AND KNIFE HANDLE

[76] Inventor: Travis W. Arterbury, 1700 W. Fourth St., Russellville, Ark. 72801

[21] Appl. No.: 219,307

[22] Filed: Jul. 15, 1988

[51] Int. Cl.⁴ .................................................. B25G 1/10
[52] U.S. Cl. .............................. 16/110 R; 16/111 R; 30/314; 280/821
[58] Field of Search .... 16/111 R, DIG. 12, DIG. 19; 280/821; 135/72; 17/66; 30/298, 343; D8/107, 303, 307, 313, 314; D7/137, 150; D22/118; 74/551.9, 558; 81/177.1, 177.3, 489

[56] References Cited

U.S. PATENT DOCUMENTS

| | | | |
|---|---|---|---|
| D. 287,042 | 12/1986 | Hoffman | D22/118 |
| 1,570,025 | 1/1926 | Young | 16/111 R |
| 4,038,719 | 8/1977 | Bennett | 16/110 R |
| 4,161,051 | 7/1979 | Brodwin | 16/110 R |
| 4,283,854 | 8/1981 | Austin | 30/298 X |
| 4,613,156 | 9/1986 | Lajos | 280/821 |
| 4,617,697 | 10/1986 | David | 16/111 R X |

FOREIGN PATENT DOCUMENTS 1112170  11/1955  France .......................... 16/DIG. 12

*Primary Examiner*—Nicholas P. Godici
*Assistant Examiner*—James R. Miner
*Attorney, Agent, or Firm*—Stephen D. Carver

[57] ABSTRACT

An ergonomically efficient knife and implement handle fits the natural curve of the clasped hand and efficiently aids repetitive cutting motions. The handle comprises a major longitudinal rib arcuately extending between spaced-apart integral anterior and posterior ends. The handle is tightly grasped by the curled fingers and palm of the user's hand. An arch integrally extends along and across the rib between the anterior and posterior ends to define an orifice which receives the user's thumb and a portion of the user's palm, and it facilitates comfortable twisting movements of the handle. An anterior hook shaped to coincide with the natural curve of the dorsal surface of the index finger aids in thrusting during repetitive cutting movements. A thumb rest defined at the top of the anterior end of the rib fits the distal phalanx of the thumb. The thumb rest transfers the force of the thumb to the implement. A posterior hook at the rib posterior end engages the naturally curved surface of the hand to ease repetitive retrieval motions. The anterior hook, the anterior thumb rest, the arch, and the posterior hook enable the user to periodically relax his hand between cutting motions without dropping the handle.

14 Claims, 4 Drawing Sheets

ERGONOMIC KNIFE AND KNIFE HANDLE

BACKGROUND OF THE INVENTION

The present invention relates broadly to implement handles. More particularly, the present invention relates to an improved handle for utility knives which is adapted to fit the natural contours of the human hand to reduce strain and risk of injury. The invention is believed best classified in U.S. utility class 16, subclass 110R. The most pertinent prior art is found in class 16, Digest 19.

As will be appreciated, a variety of muscles in the hand and forearm must be employed for manipulation of a utility knife. The muscles of the forearm include the flexor digitorum profundus and flexor digitorum superficialis, which extend from the elbow into the length of the fingers. The flexor digitorum profundus terminates in four tendons, which enter the hand beneath the transverse carpal ligament. Four small muscles, known as the lumbricals, are connected with the tendons of the flexor digitorum profundus in the palm.

The flexor pollicis longus and flexor pollicis brevis extend the length of the forearm between the biceps and the wrist and into the length of the thumb. The pronator quadratus is associated with the wrist. Action of the wrist is controlled by motion of the flexor carpi ulnaris and a band of muscle which encircles the wrist, known as the flexor carpi radialis.

In the hand, the extensor pollicis longus and extensor pollicis brevis extend from the wrist into the thumb. The adductor pollicis longus and adductor pollicis brevis span the base of the fingers and bridge the fingers with the thumb. The flexor pollicis extends between the thumb and the wrist. Finger movement is generally controlled by the flexor pollicis brevis, associated with the thumb, and the opponens digiti minimi, flexor digiti minimi and abductor digiti minimi, which are associated with the fifth metacarpal of the hand.

The flexor digitorum superficialis flexes the second phalanx of each finger, the first phalanx at the metacarpophalangeal joint, and the hand at the wrist joint. It is supplied by branches of the median nerve. The flexor digitorum profundus is the most powerful of the forearm muscles. It flexes the terminal phalanx of each finger, the other phalanges, and the hand. It is supplied by the median nerve and a branch of the ulnar nerve. The tendons associated with the muscles of the hand and forearms comprise fibrous tendon sheaths. The base of the hand includes the muscles of hypothenar eminence, generally associated with the little finger, and the muscles of thenar eminence, generally associated with the thumb. The two latter muscle groups are bridged by the flexor retinaculum which forms the base of the palm.

As will be appreciated by those familiar with the meat processing industry, utility knives are used by various line workers to cut meat into packaging portions. Numerous repetitive cutting motions are required. For example, a typical line worker in the poultry industry will make in the order of fifteen thousand cuts per working day. When the hand is tightly clasped, as when a knife is firmly grasped, the muscles of the hand remain in tension and the flexor digitorum is tightly compressed. The muscles compress the radial artery and hinder circulation to the fingers. During a cutting operation, the line worker must intermittently grab and release the knife handle and must apply both forward and backward pulling motions to effectuate a sawing or slicing motion.

Conventional utility knives may include elongated, flattened handles with finger grips defined on the lower portion. Such knife handles typically include a planar shield at the forward end which separates the handle from the blade of the knife and provides the worker a pushing surface to facilitate sawing. The rearward end of the handle typically includes a downwardly extending flange which provides a pulling surface and prevents the knife from inadvertently slipping from the workers' hand.

Such conventional knife handles must be firmly grasped in the worker's clasped hand and retained in position by the fingers. It is imperative that the worker maintain a tight grip on the handle while manipulating the knife to deliver adequate cutting force to the blade. The complex musculature and nerves of the cutting hand are heavily taxed by the repeated impacts which result during cutting. With such conventional handles, force is experienced mainly at the base of the fingers. Additionally, blood circulation to the hand and fingers is greatly restricted when the hand remains in a tightly clasped position. Thus, continual use of such conventional utility knives often causes a great deal of discomfort and may result in permanent injury to the worker's hand. Disorders such as carpal tunnel syndrome and tendonitis are commonly caused by repetitive impact such as is experienced by the poultry line worker.

Hence it would be desirable to provide an ergonomic utility handle which could be easily and comfortably retained in the worker's relaxed hand without undue strain and without constriction of blood vessels or nerves.

In the prior art known to me, a variety of contoured implement handles have been suggested. For example, the tool handle disclosed by Bennett, U.S. Pat. No. 4,038,719, issued Aug. 2, 1977, includes an elongated shaft having a tapered end portion which is angled to fit into the worker's hand. The handle relieves strain and tension experienced by the worker during use, because the worker's wrist and forearm remain in a relaxed position. U.S. Pat. No. 4,617,697 issued to David on Oct. 21, 1986 discloses a deformable jacket adapted to be fitted about an implement handle to conform to the contours of the worker's hand.

The knife handle disclosed by Hoffman in U.S. Design Pat. No. D287,042, issued Dec. 2, 1986, includes a handle body of semi-arcuate configuration. The contoured butt portion of the handle body extends angularly downwardly. The forward end defines a receptacle for the knife blade which flares outwardly at the top and bottom to shield the worker's hand from the knife blade. The upper edge is notched to provide an improved grip.

The most relevant prior art known to me is U.S. Pat. No. 4,161,051, issued to Brodwin on July 17, 1979. The contoured handle disclosed therein includes corresponding curved portions adapted to fit comfortably within the palm of the worker's hand. The forward end of the handle rests upon the worker's thumb and creates a generally L-shaped rest for the fingers. The rearward end of the handle is adapted to wrap about the user's thumb and rest generally against the flexor pollicis brevis.

None of the prior art contoured handles known to me provide adequate support for the thumb to assist the worker to perform continual sweeping, sawing, or cutting motions required to cut poultry meat for packaging. Moreover, the prior art fails to teach adequate grip means which permit unobstructed free blood circulation and nerve conduction to the hands. Finally, the prior art handles known to me suggest no means for permitting the worker's hand to intermittently grip the handle and relax the grip without releasing the knife altogether.

SUMMARY OF THE INVENTION

The present invention comprises an ergonomically efficient handle adapted to fit the naturally curved clasped hand. The handle efficiently directs the force of the action to the flexor pollicis longus, extensor pollicis longus, extensor pollicis brevis, flexor pollicis brevis, abductor pollicis longus, abductor pollicis brevis, opponens pollicis and abductor pollicis of the thumb and the opponens digiti minimi, flexor digiti minimi and abductor digiti minimi of the fifth metacarpal of the hand.

The handle comprises a major longitudinal rib arcuately extending from an anterior end to a spaced apart posterior end. The rib is adapted to be tightly grasped by the curled fingers and palm of the hand. With the hand in a clasped position, the longitudinal rib runs congruent to the palmar surface of the thumb to the middle of the first metacarpal and continues across the palm to the medial border.

A superior arch extends across the rib, extending between the anterior and posterior ends. It defines an orifice between itself and the rib through which the users thumb may be inserted. The arch runs from the anterior-lateral border to the posterior-medial border attaching approximately one-sixth and five-sixths of the distance of the handle, measuring anterior-posteriorially. The arch rises approximately two to three inches at its apex depending upon the size of the hand. The apex is located at approximately the mid-point of the length of the arch. The arch follows the natural curve of the hand between the thumb and index finger and continues along the curvature of the palmar surface to the junction of the longitudinal rib. The width of the arch is variable depending on hand size.

An anterior-inferior hook integrally associated with the anterior end of the rib accommodates the index finger in a normal clasped position. It is shaped to coincide with the natural curve of the dorsal surface of the finger and may extend slightly beyond the medial border. A thumb rest defined upon the anterior end of the rib is designed to fit the palmar surface of the distal phalanx of the thumb. It is designed to be parallel to the axis of the tool or to coincide with the axis of the tool. The thumb rest transfers the force of the thumb to the axis of the tool and is not merely a "rest for the thumb."

A posterior hook associated with the handle extends from a point near the rib posterior. It is essentially a continuation of the rib and follows the natural curve of the medial border of the hand and continues on the dorsal surface for approximately one inch.

The anterior-inferior hook, the anterior-medial thumb rest, the superior arch, and the posterior hook are preferably either extensions of or attached to the longitudinal rib.

Unlike traditional handles, the handle repositions the force from the base of the fingers to the larger thenar muscles of the thumb and the hypothenar muscles of the fifth metacarpal and fifth digit. This allows the fingers to be relatively relaxed; therefore, blood flow and nerve conduction is unobstructed. As a result of this re-direction of force, repetitive action diseases such as carpel tunnel syndrome, tendonitis, etc. should be greatly diminished or even eradicated. The superior arch of the handle not only provides contact points for the application of force, but also allows workers to relax the grip after forceful contractions without dropping the tool. This period of relaxation provides time for muscles to relax and recover between episodes of work and if there has been any reduction of blood or nerve flow, it allows for recovery.

Thus it is a broad object of the present invention to provide an implement handle which reduces fatigue, muscle cramping, and the like.

A fundamental object of the present invention is to provide an efficient implement handle which can be used for long periods of time in manual repetitive actions.

A similar object of the present invention is to reduce carpal tunnel syndrome, tendonitis, and other repetitive action diseases caused or complicated by industrial processing manipulations requiring repetitive manual actions.

A basic object of the present invention is to more fully distribute the various manipulative forces encounter by a handle in manual operation. It is a fundamental feature of the present invention that thrusting and retrieving forces, torsional forces, and downward pressuring forces are distributed by the handle to different sections of the hand.

Another basic object of the present invention is to provide a handle of the character described which allows for periodic repetitive movements which allows workers to relax their grip after forceful contractions without dropping the handle or tool.

Thus a related object is to provide a handle of the character describe the use of which provides relaxation time during which muscles may relax and recover between periodic, serial episodes of work.

Another fundamental object is to provide a handle for repetitive, industrial line use which is easy for workers to use, and which helps minimize fatigue, muscle soreness, and work related health problems.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
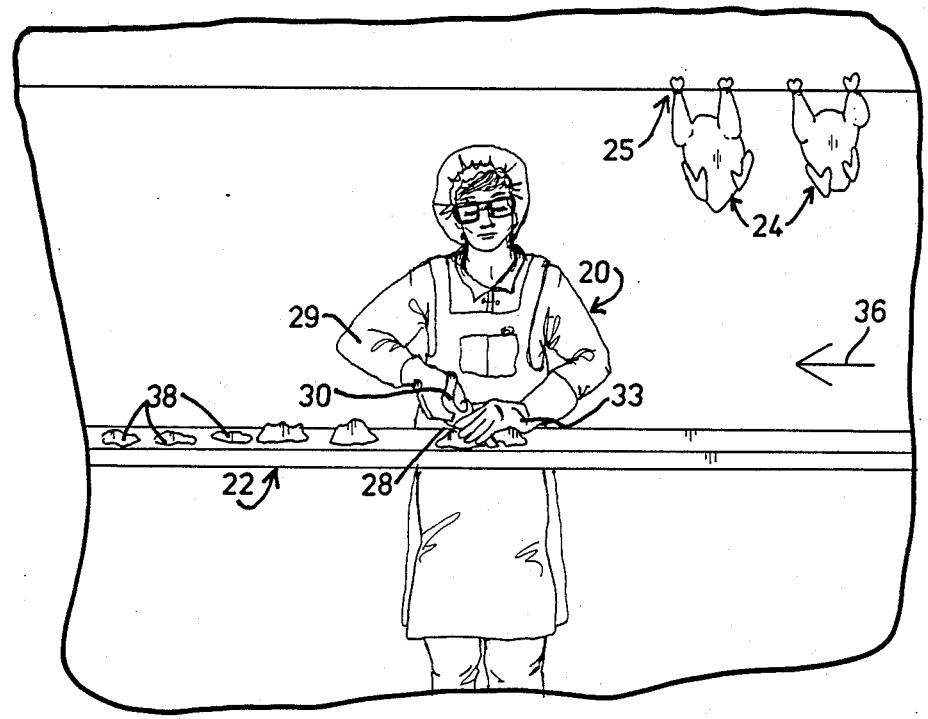
FIG. 1 is a fragmentary, pictorial view illustrating a worker utilizing a knife to cut up chicken carcasses arriving on a typical conventional overhead conveyer.
Figure 2:
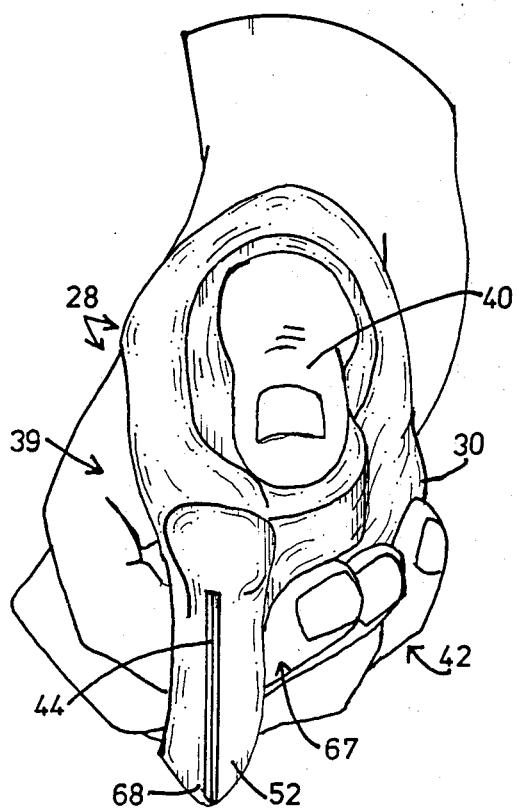
FIG. 2 is an enlarged, fragmentary front plan view of a knife constructed in accordance with the teachings of the present invention, with the handle properly grasped by the hand of the user.
Figure 3:
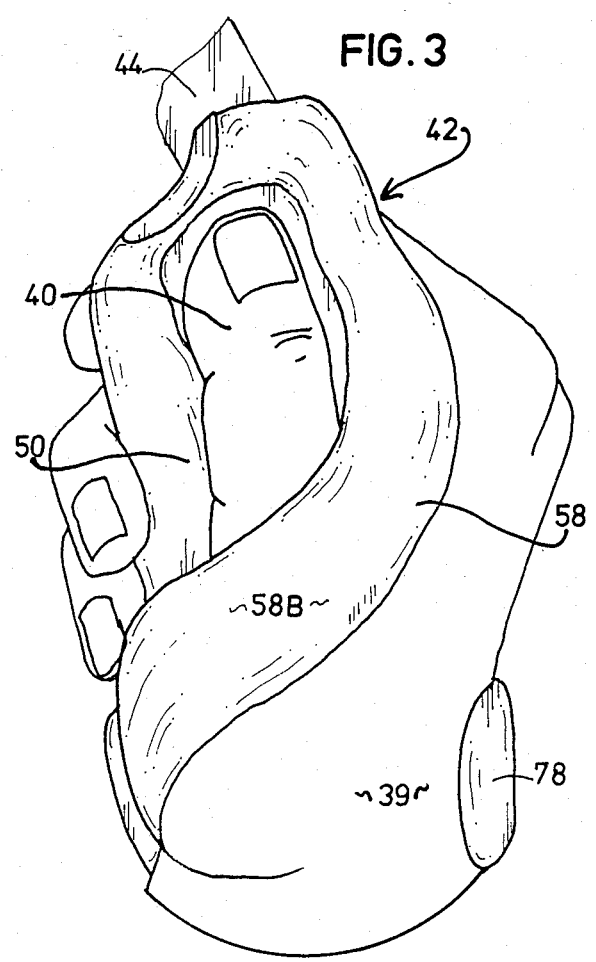
FIG. 3 is a fragmentary, pictorial view generally illustrating the top of the handle when grasped by a user.
Figure 4:
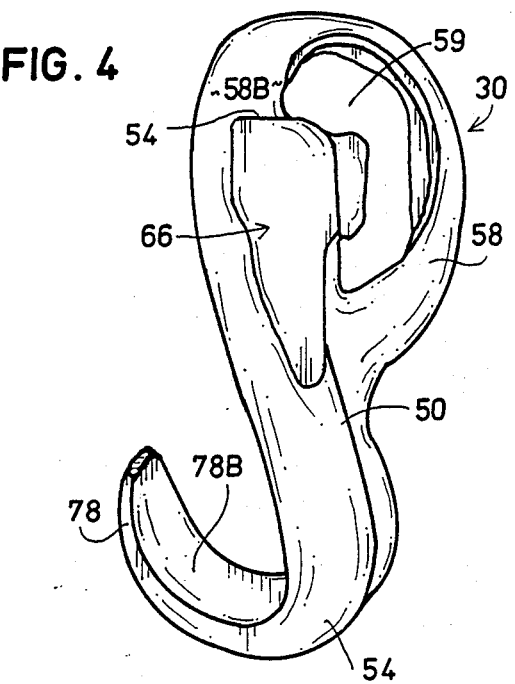
FIG. 4 is a front plan view of the preferred handle.

With initial reference now directed to FIGS. 1 through 3 of the appended drawings, a worker 20 is illustrated in a position adjacent a typical lateral conveyer 22 processing chicken carcasses 24 which arrive via a conventional overhead conveyer system, generally designated by the reference numeral 25. As illustrated, the worker 20 employs a knife, generally designated by the reference numeral 28, equipped with the handle 30 of the present invention. As shown, worker 20 is employing her right arm 29 to manipulate the knife 28, and may grasp chickens 24 with her gloved left hand 33. Conveyer 22 moves in the direction of arrow 36, and whole chickens 24 may be reduced to smaller parts 38 by suitable cutting. Although the illustration of FIG. 1 discloses the general environment in which the invention may be ideally employed, it will be recognized by those skilled in the processing arts that a wide variety of different conveyer configurations and food products may be involved with the particular invention.

FIG. 2 illustrates how the hand of the user, generally designated by the reference numeral 39, may comfortably grab the apparatus. The fingers 42 curl around the handle, and the thumb 40 is admitted in a comfortable position. As illustrated, the knife 28 includes a knife blade 44 projecting towards the viewer, which may take on a variety of configurations. The handle of the present invention may be employed with a wide variety of implements, such as the knife element 44 or other implements such as saws, files or the like.

Figure 6:
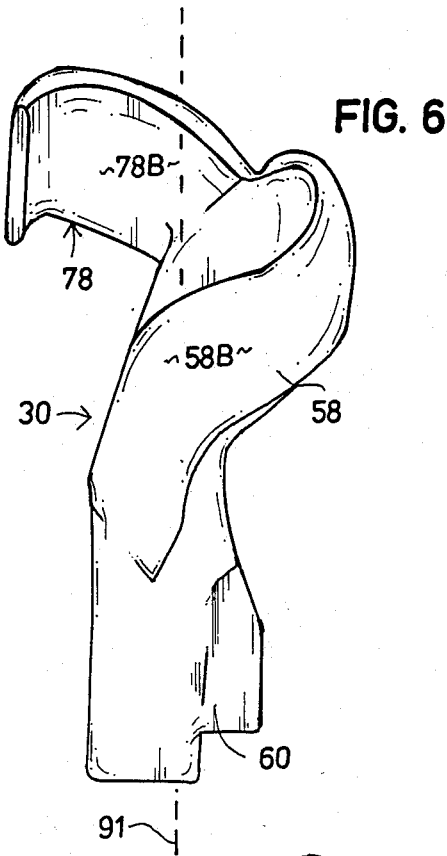
FIG. 6 is a top plan view thereof.
Figure 5:
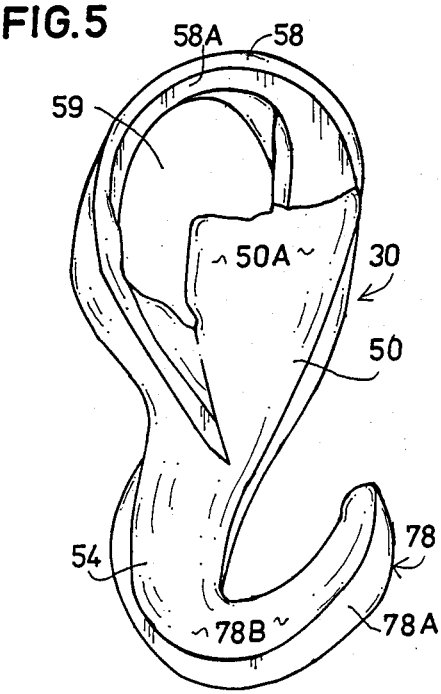
FIG. 5 is a rear plan view of the preferred handle.
Figure 7:
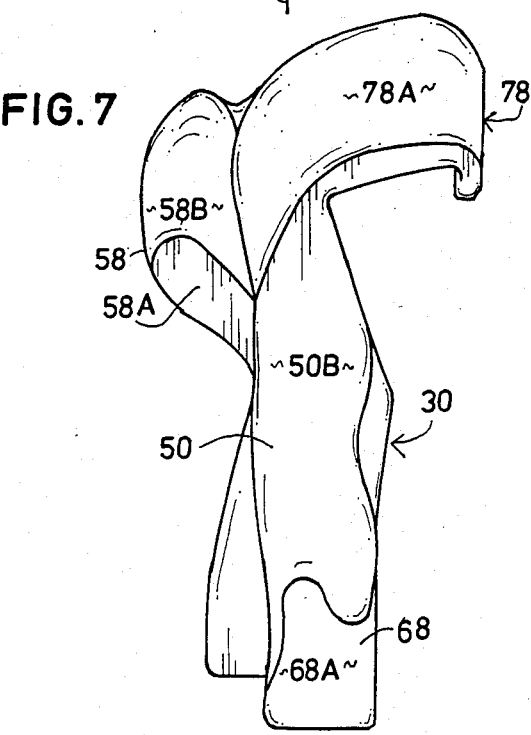
FIG. 7 is a bottom plan view thereof.
Figure 8:
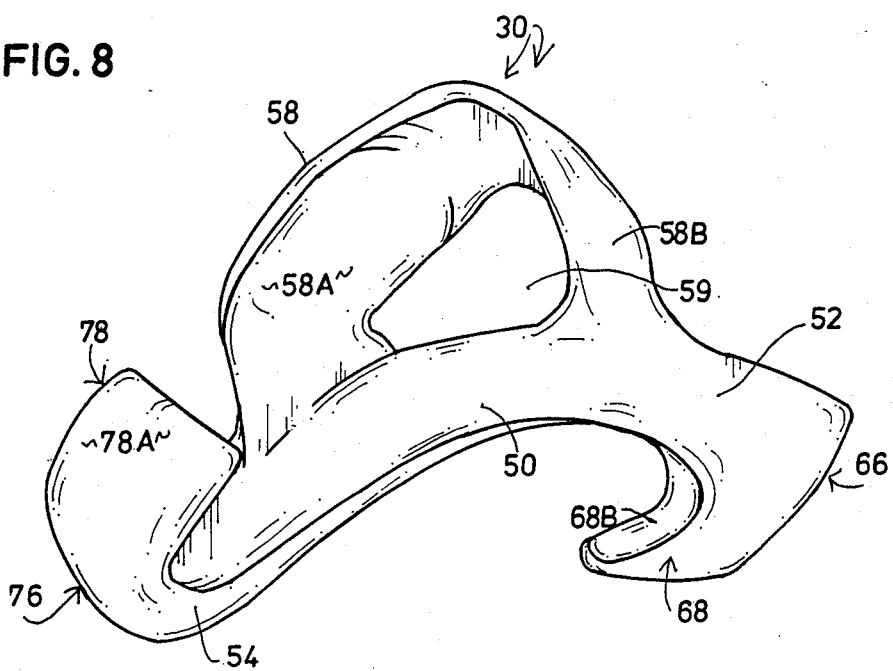
FIG. 8 is a right side elevational view thereof.
Figure 9:
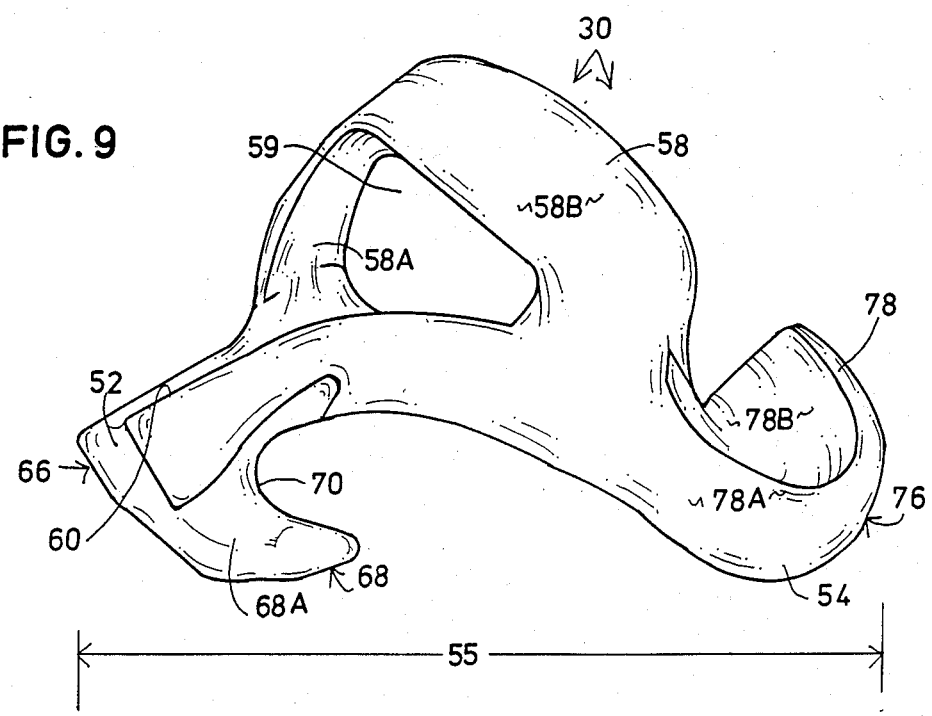
FIG. 9 is a left side elevational view thereof.
Figure 10:
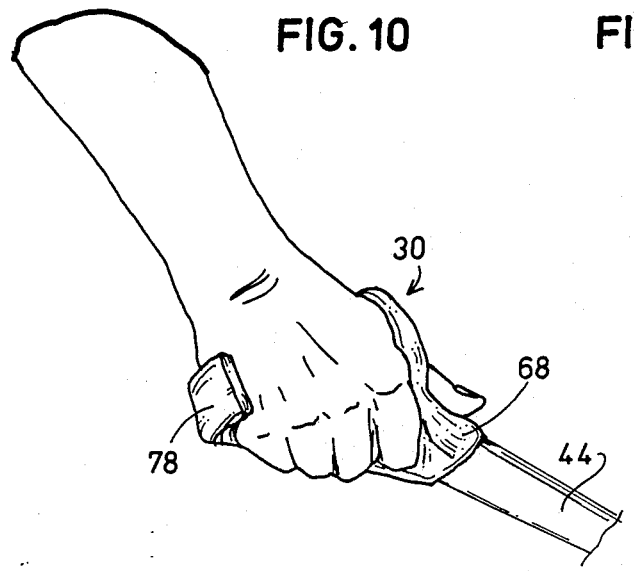
FIG. 10 is a fragmentary, right side, pictorial view.
Figure 11:
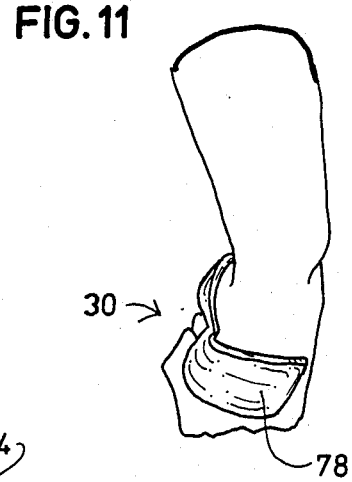
FIG. 11 is a fragmentary, bottom pictorial view.
Figure 12:
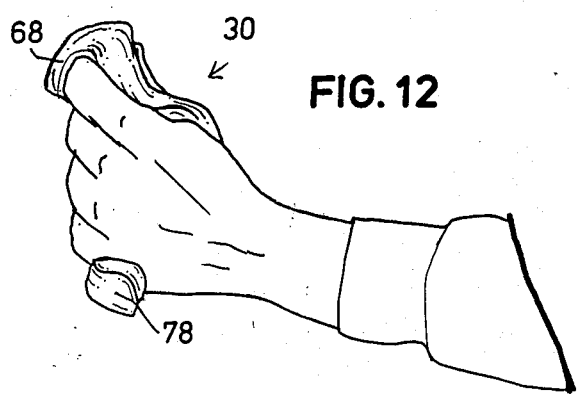
FIG. 12 is a fragmentary, pictorial view of a left handed version of the handle.
Figure 13:
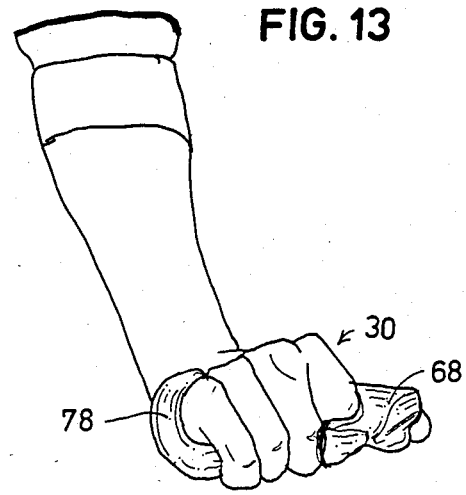
FIG. 13 is a fragmentary, right side view similar to FIG. 11.
Figure 14:
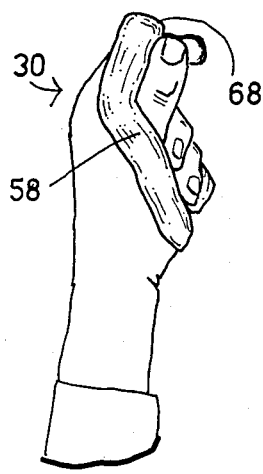
FIG. 14 is a fragmentary, pictorial top view of the left hand version of the left handed handle of FIG. 12; and, FIG. 15 is a fragmentary, left side pictorial view, with the handle grasped as in FIGS. 10 through 14.
Figure 15:
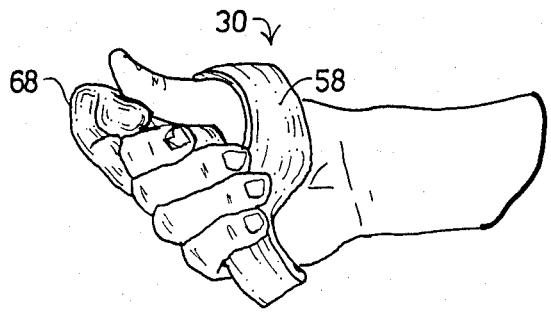

Turning additionally now to FIGS. 4 through 9, the handle 30 preferably comprises a plurality of integrally connected generally arcuate portions. An integral, arcuate longitudinal rib is generally designated by the reference numeral 50. Rib 50 extends from an anterior end 52 (facing the viewer in FIG. 2), and extends rearwardly to a region 54 across a posterior end. The upper outside surface area of the rib has been broadly designated by the reference numeral 50A, and the lower surface area of the rib has been generally designated as the reference numeral 50B (FIG. 7). The grasping hand will curl around both of the latter surfaces when the rib is tightly grasped. The length of the handle has been broadly designated by the reference numeral 55 in FIG. 9.

An arch, generally designated by the reference numeral 58 is integrally associated with the rib 50. Preferably the arch begins at a point located approximately one-sixth of the length 55 of the handle from the anterior handle end 52. The arch curves around and ends at a point located approximately five-sixths of the length 55 from anterior end 52. An orifice 59 is thus formed between the rib 50 and the arch 58. Orifice 59 may be penetrated by the thumb 40 of the user, as shown in FIG. 3. The arch terminates approximately at the anterior end of the rib immediately adjacent a thumb rest, generally designated by the reference numeral 60, which is adapted to be contacted by the thumb 40 of the user for exerting downward pressure. At the same time, the hand is inserted to grasp the rib as indicated, the rib surface 58A will contact that portion of the hand immediately adjacent the base region of the thumb 40 and the wrist. The latter region of the hand has been generally designated by the reference numeral 45 (FIG. 3).

Surface region 58A is adapted to generally conform to the natural curve of the user's hand and thumb region, and it will be apparent that it contacts the outer sides of the thumb and curves around the base of the thumb presenting a surface which contacts the underside of the clasped palm when then hand is inserted.

Preferably an anterior hook, generally designated by the reference numeral 66 is integral with rib 50 and includes a rearwardly curved hook portion 68 which curl's under the hands and projects rearwardly (as viewed in FIGS. 2 and 3). The inner side of the anterior hook 66 has been generally designated by the reference numeral 68B. The outside surface of the anterior hook 66 has been generally designated by the reference numeral 68A. As best viewed in FIG. 2, the forwardmost outer ends of the forward fingers 67 will project inwardly against the arcuate region 70 (FIG. 8 and 9) formed between the underside of rib 50 and the curved inner surface of the anterior hook 66. Normally the outside of the index finger of the user will thus be inserted into region 70, so that forward movement of the hand will thus thrust the handle forwardly; i.e. toward the viewer in FIG. 2.

Preferably the handle 30 comprises a posterior hook, generally designated by the reference numeral 76. It includes an arcuately curved terminal portion 78, and an outer surface generally designated by the reference numeral 78A and an arcuate inner surface generally designated by the reference numeral 78B. The posterior hook is integrally coupled to the posterior of the rib 50, and is adapted to curve about the medial border of the hand in contact with at least a portion of the dorsal surface when the fingers are tightly grasped about the rib. Thus when the hand is withdrawn (as viewed in FIG. 2) the base portion of the palm of the hand will drag the handle rearwardly by contacting with underside 78B of the posterior hook 78.

With additional reference now directed to FIGS. 10–15, when the hand is inserted into the handle 30, forward motion of the hand will generally transmit thrust by contact with the anterior hook 68. Rearward motion of the hand will drag the handle and the associated implement, such as knife blade 44, by contact with the posterior hook 78. It should also be appreciated that torsional movement of the hand will assist in transmitting torsional twisting like motions to the implement handle since the hand is tightly grasped about the rib, and since the hand is conformed within orifice 59, tightly abutting the interior 58A of the arch 58.

The handle directs the thrusting motion through the index finger to its base and through the thenar muscles of the thumb to the capitulum of the humerus. The force runs parallel with the longitudinal axis of the forearm and at an angle of approximately ten degrees with the axis 91 (FIG. 6). Rotary forces are directed from the base of the ring finger through the hypothenar muscles to the lateral side of the elbow. The thrusting force is placed on the heavy thenar muscles of the thumb and the webbing between the thumb and index finger. Pulling force is placed on the hypothenar muscles of the medial border, the downward force on the distal phalanx of the thumb, the inward rotation on the palmar surface of the thumb and the posterior-medial border of the hand, and the outward rotation of the anterior-medial border and the posterior surface of the proximal and distal phalanges of the thumb.

The concepts of the invention may be employed in conjunction in either left-handed or right handed modes. The left handed version essentially comprises a mirror image of the right handed version illustrated and discussed in detail herein.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

What is claimed is:

1. An ergonomically efficient handle for manipulating an attached implement, said handle comprising:
   a rigid arcuate, longitudinal rib adapted to be grasped by the hand of a user, said rib extending between an anterior end adapted to be coupled to said implement and a spaced-apart posterior end;
   a thumb rest disposed upon said anterior end adapted to be contacted by the thumb of a user for facilitating the downward transfer of force when said handle is used;
   an anterior hook disposed at said anterior end of said rib adapted to be contacted by the index finger of the user to aid in thrusting said implement;
   a posterior hook disposed at said posterior end of said rib for aiding in the pulling of said implement;
   an integral, arcuate arch for aiding in the manipulation of said handle, said arch extending from one side of said rib at said rib anterior end over and around the hand of the user to an opposite side of said rib at said posterior end, said arch having an interior surface generally conforming to and adapted to be contacted by the naturally curved top surface of the user's hand when the handle is used, and said arch defining an orifice between itself and said rib through which said user's thumb and a portion of the user's palm is extended when grasping the handle.

2. The handle as defined in claim 1 wherein said arch integrally originates from said rib at a point located approximately one-sixth the length of the rib from said rib anterior end, and integrally terminating in said rib at a point approximately five-sixths the length of said rib from said rib anterior end.

3. The handle as defined in claim 1 wherein said posterior hook is curved rearwardly from said rib posterior end about the medial border of the user's hand in contact with at least a portion of the dorsal surface.

4. The handle as defined in claim 3 wherein said anterior rib is shaped to conform to the natural curve of the dorsal surface of the user's index finger.

5. An ergonomically efficient implement handle comprising:
   a rigid longitudinally extending, arcuate rib adapted to be firmly grasped by the hand and fingers of a user, said rib extending between an anterior end adapted to be coupled to an implement and a spaced-apart posterior end;
   an arch for aiding in the manipulation of said handle, said arch extending approximately from said anterior end at one side of said rib to an opposite side of said rib at said posterior end, said arch having an inner surface generally conforming to the natural curve of the user's hand, and said arch defining an orifice between itself and said rib penetrated by the user's thumb and a portion of the user's palm;
   an anterior hook associated with the anterior of said rib adapted to contact the index finger of a user for aiding in the thrusting of said handle; and,
   a posterior hook associated with rear of said rib for contacting the rear of the user's hand thereby aiding in the pulling of said handle without requiring the clasping of the fingers.

6. The handle as defined in claim 5 including a thumb rest disposed upon said anterior end of said rib adapted to be contacted by the thumb of the user for facilitating the downward transfer of force when said handle is used.

7. The handle as defined in claim 6 wherein said arch integrally originates from said rib at a point located approximately one-sixth the length of the rib from said rib anterior, end, and integrally terminating in said rib at a point approximately five-sixths the length of said rib from said rib anterior end.

8. An ergonomically efficient knife comprising:
   a rigid arcuate rib adapted to be firmly grasped by the hand and fingers of a user, said rib extending between an anterior end and a spaced-apart posterior end; and,
   a blade extending forwardly from said rib anterior end;
   an arch for aiding in the manipulation of said knife, said arch extending approximately from said rib anterior end at one side of the said rib to an opposite side of said rib at said posterior end, said arch having an inner surface generally conforming to the natural curve of the user's hand, and said arch defining an orifice between itself and said rib penetrated by the user's thumb and a portion of the user's palm.

9. The knife as defined in claim 8 wherein said rib comprises a thumb rest defined upon said rib anterior end to be contacted by the thumb of the user for facilitating the downward transfer of force when said knife is used.

10. The knife as defined in claim 9 including:
    an anterior hook defined on said anterior end of said rib adapted to contact the index finger of a user at the underside of said rib for aiding in the thrusting of said knife; and,
    a posterior hook defined on the posterior end of said rib for contacting the rear of the hand of a user to aid in the pulling of said knife without requiring the fingers to be clasped.

11. The knife as defined in claim 10 wherein said arch integrally originates from said rib at a point located approximately one-sixth the length of said rib from said rib anterior end, and integrally terminating in said rib at a point approximately five-sixths the length of said rib from said rib anterior end.

12. An ergonomically efficient handle for manipulating attached implements, said handle comprising:

a rigid arcuate, longitudinal rib adapted to be grasped by the hand of a user, said rib extending between an anterior end adapted to be coupled to said implement and a spaced apart posterior end;

a thumb rest disposed upon said anterior end adapted to be contacted by the thumb of a user for facilitating the downward transfer of force when said handle is used;

an anterior hook disposed at the anterior end of said rib adapted to be contacted by the index finger of the user to aid in thrusting said implement;

a posterior hook disposed at the posterior end of said rib for aiding in the pulling of said implement;

an integral, arcuate arch for aiding in the manipulation of said handle, said arch extending from one side of said rib at said rib anterior end over and around the hand of the user to an opposite side of said rib at said posterior end, said arch having an interior surface generally conforming to and adapted to be contacted by the naturally curved top surface of the user's hand when the handle is used, and said arch defining an orifice between itself and said rib through which the user's thumb and a portion of the user's palm is extended when grasping the handle; and, wherein when rotary forces are directed from the base of the user's ring finger through the hypothenar muscles to the lateral side of the user's elbow, inward knife rotation forces the palmar surface of the thumb and the posterior-medial border of the hand into contact with the arch inner surface, and outward rotation of the knife forces the anterior-medial border and the posterior surface of the proximal and distal phalanges of the thumb into contact with the arch.

13. An ergonomically efficient knife comprising:

a rigid arcuate rib adapted to be firmly grasped by the hand and fingers of a user, said rib extending between an integral anterior end an integral, spaced apart posterior end;

a blade extending forwardly from said rib anterior end;

a rigid arcuate arch for aiding in the manipulation of said handle, said arch extending approximately from said anterior end at one side of the rib to an opposite side of the rib at said posterior end, said arch having an inner surface generally conforming to the natural curve of the user's hand, and said arch defining an orifice between itself and said rib penetrated by the user's thumb and a portion of the user's palm, whereby the arch contacts the palmar surface of the thumb and the posterior-medial border of the hand during inward rotation, and the anterior-medial border and the posterior surface of the proximal and distal phalanges of the thumb during outward rotation;

a thumb rest associated with the anterior end of said rib adapted to be contacted by the thumb of the user for facilitating the downward transfer of force when said knife is used.

14. The knife as defined in claim 13 including:

an anterior hook defined on the anterior end of said rib adapted to contact the forwardmost outer ends of the index finger of a user at the underside of said rib for aiding in the thrusting of said handle; and, a posterior hook defined on the posterior end of said rib for contacting the rear of the hand of a user to aid in the pulling of said handle without requiring the fingers to be clasped, said posterior hook curving about the medial border of the hand in contact with at least a portion of the dorsal surface when the fingers are rightly grasped about the rib.

* * * * *